Aug. 3, 1926.

J. GUTKNECHT

ATTACHMENT FOR CASH DRAWERS

Filed July 13, 1925

1,594,723

INVENTOR.
JACOB GUTKNECHT.
BY Arthur L. Slee
ATTY.

Patented Aug. 3, 1926.

1,594,723

UNITED STATES PATENT OFFICE.

JACOB GUTKNECHT, OF SAN FRANCISCO, CALIFORNIA.

ATTACHMENT FOR CASH DRAWERS.

Application filed July 13, 1925. Serial No. 43,422.

My invention relates to improvements in attachments for cash-drawers wherein members operate in conjunction with one of the sides or walls of the cash compartments of the said cash-drawer to form cash receiving receptacles within each compartment to receive and retain the cash deposited within said drawer for each cash transaction, and also in conjunction with a trip arranged to actuate said members to deposit cash within said receiving receptacle into its respective compartment automatically whenever the cash-drawer is opened, as well as means for rendering said trip inoperative whereby said deposited cash for the last transaction may be inspected when said drawer is opened.

In establishments where cash-drawers and cash registers with cash-drawers therein are used, it sometimes happens that either the customer or the proprietor has an erroneous impression as to the exact denomination of the coins paid for the transaction, and as a consequence a dispute arises as to the correctness of the change received.

Even where the customer has an erroneous impression as to the exact amount paid, a proprietor will sometimes, in order to prevent dissatisfaction, suffer a financial loss. Even in such a case the customer sometimes retains the impression that the proprietor endeavored to impose upon said customer by "short-changing" him. In order to prevent both the financial loss, and also the formation of an erroneous impression by the customer I have provided the following improvement which consists in providing what I term cash-receiving receptacles within each compartment of a cash-drawer into which all coins are always deposited for every transaction, change, if any is required, being made directly from the main compartment itself instead of from the cash-receiving receptacle within said compartment.

The primary object, then, of the present invention, is to provide an improved cash-receiving receptacle for each cash compartment of a cash-drawer wherein the cash received for every separate transaction is deposited and retained until the drawer is opened for the next transaction.

Another object is to provide improved means for tripping said receptacles at each opening of the cash-drawer to deposit cash within said receiving receptacles into the main compartment each time the cash-drawer is opened whereby the receptacles will be emptied and ready to receive the coins of the next transaction.

A further object is to provide means for preventing the transfer of coins from the receiving receptacle to the main compartment whereby the cash may be retained within said receiving receptacles for inspection purposes when the drawer is opened in case any dispute arises as to the amount of money or the denomination of the coins paid to the proprietor.

I accomplish these and other objects by means of the device disclosed in the drawings forming a part of the present specification wherein like characters of reference are used to designate similar parts throughout the said specification and drawings, and in which—

Figure 1:
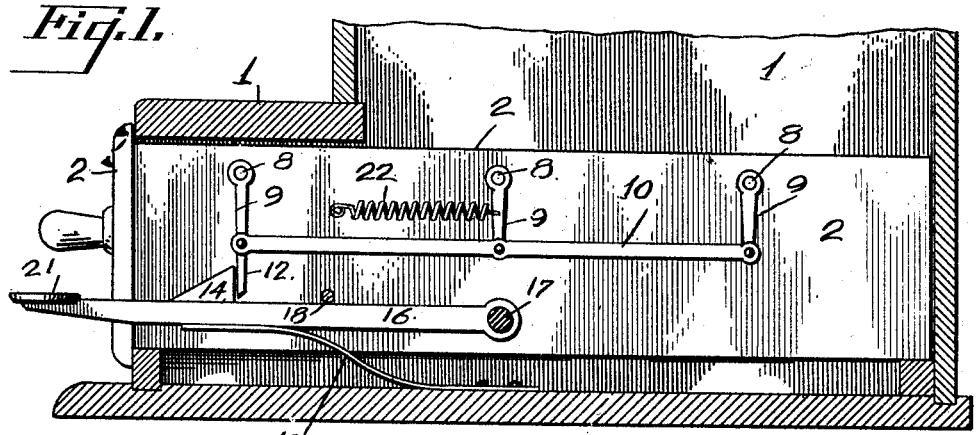
Fig. 1 is a broken vertical sectional view of a cash-register showing the cash-drawer in elevation, with the tripping mechanism mounted upon the side thereof.

Referring to the drawings the numeral 1 is used to designate in general a cash-register or the like having the usual slidably mounted cash-drawer 2 provided with a plurality of cash compartments 3.

The present invention consists of an attachment for cash-drawers and comprises angular members 4 having lateral extensions 6 formed on the lower ends thereof, the free ends of said extensions 6 being arranged to rest against one of the walls or sides of its respective compartment 3 and thereby form what I term, for purposes of illustration, cash receiving receptacles 7.

The members 4 are secured to transversely disposed shafts or rods 8 pivotally mounted within the cash-drawer 2 and projecting beyond one end thereof, said projecting ends being provided with arms 9 in turn pivotally connected by means of a connecting rod 10 whereby all of the members 4 may be actuated simultaneously, in a manner hereinafter more fully set forth, to deposit coins 11 therein into the compartments 3.

One of the arms 9 is provided with an extension 12 arranged to be engaged by a trip 14 mounted upon an arm 16 pivotally mounted upon the cash-register 1 as at 17, the said trip 14 and lever 16 being normally held in operative position against a stop 18 by means of a suitable spring 19, as disclosed in Fig. 1 of the drawings.

The tripping arm 16 extends exteriorly of the cash-register 1 adjacent the front end of the cash-drawer 2 therein and is offset to permit passage of said cash-drawer 2. The outer or projecting end of the tripping arm 16 is provided with a suitable button 21 by means of which the said tripping arm may be depressed against the tension of the spring 19 away from the path of the extension 12 of the arm 9.

Figure 2:
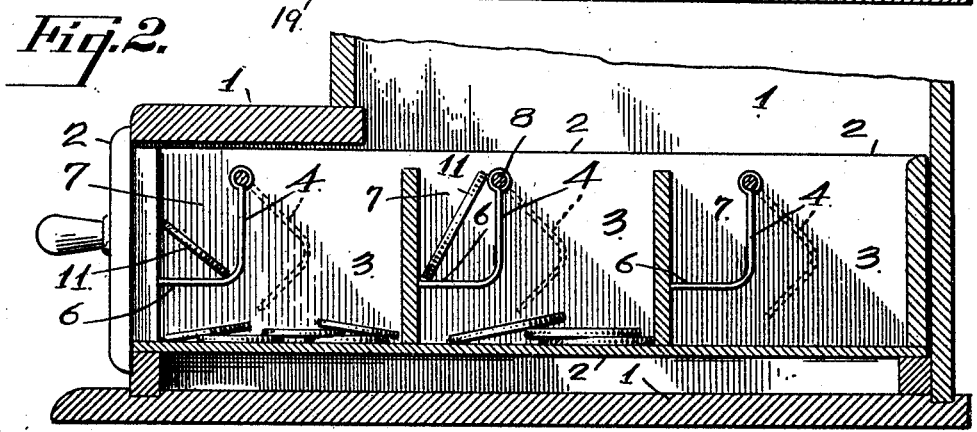
Fig. 2 is a similar view showing the cash-drawer in vertical section and the cash receiving receptacles in operative position in full lines.
Figure 3:
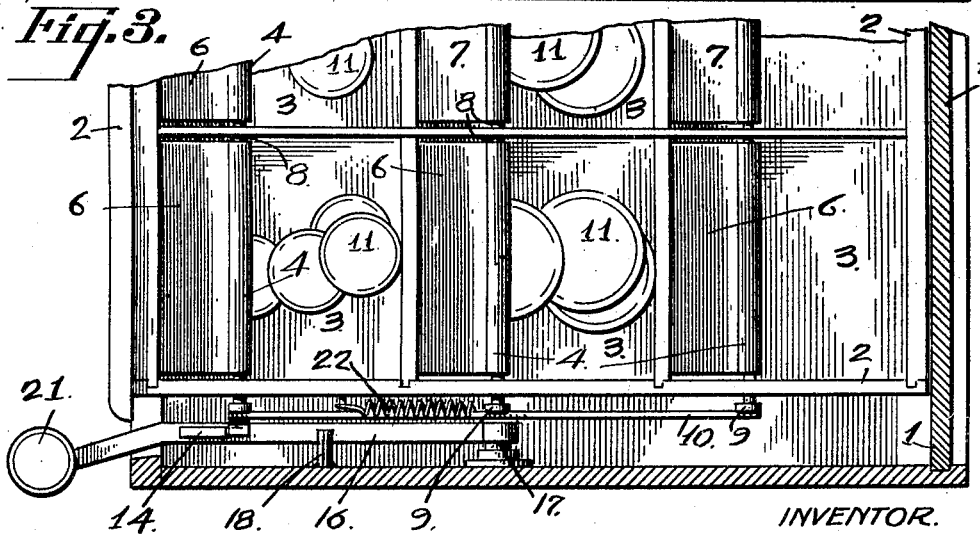
Fig. 3 is a broken plan view of the cash-drawer, adjacent parts of the cash-register being shown in section.

A suitable spring 22 is connected at one end to one side of the cash-drawer 2 and at its other end to one of the arms 9 of the rods 8 whereby the tension of said spring 22 will normally tend to retain all of the cash receiving receptacles 4 in operative position as disclosed in full lines in Fig. 2 of the drawings.

In operation the drawer 2 is opened and the coins or cash of a given transaction are deposited within the cash-receiving receptacles 7. Any change which may be required is made from the coins within the main compartments 3 and not from the cash-receiving receptacles 7, and the said cash-drawer is then closed. During the closing operation or movement of the drawer 2 the extension 12 will ride over the beveled or inclined forward end of the trip 14 and depress said trip and lever 16 against the tension of the spring 19 until said extension 12 of the arm 9 passes said trip when said tension will return said trip 14 and arm or lever 16 to normal position as disclosed in Fig. 2 of the drawings.

The extension 12 and arm 9 cannot be moved during a closing movement of the drawer 2 for the reason that all of the lateral extensions of the members 4 are resting against and are prevented therefore against such movement by the sides or walls of the main compartments 3.

After the cash-drawer 2 has been closed, should any dispute arise as to the denomination of the coins paid by the customer to the proprietor the said proprietor may permit an inspection of the amount of coins or cash received by first depressing the arm 16 against the tension of the spring 19 which will remove the trip 14 away from the path of the extension 12 and thereby render said trip 14 inoperative. The cash-drawer 2 may then be opened for the inspection of the customer with the coins or cash still within the cash-receiving receptacles 7. After the customer has been satisfied of the amount and denomination of the coins or cash deposited the drawer 2 is again closed as hereinbefore set forth.

During the next opening operation of the cash-drawer 2 for making change or for any purposes, the arm 16 is not depressed and as the said drawer is opened the trip 14 will engage the extension 12 of the arm 9 and thereby actuate all of the members 4 and extensions 6 thereof and move the same to the position disclosed in dotted lines in Fig. 2 of the drawings, which movement will cause all of the coins or cash within the receptacles to be discharged into their respective main compartments 3 and thereby empty said cash-receiving receptacles 7 and render them ready for receiving the coins or cash of the next transaction.

Having thus described my invention what I claim as new and desire to secure by Letters Patent is—

1. The combination with a cash-drawer having a plurality of compartments therein, of a receiver receptacle arranged within each compartment and arranged to receive cash; and means for automatically transferring cash from said receiving receptacle into the compartment when said cash-drawer is opened; and means for preventing the said transfer of cash when said drawer is opened.

2. The combination with a cash-drawer having compartments, of a member movably mounted within each compartment and arranged to form a cash receiving receptacle in conjunction with one of the sides of said compartment and means for moving said members away from the side of said compartments to deposit cash within said receiving receptacles into said compartments whenever said cash-drawer is opened.

3. The combination with a cash-drawer having compartments, of a member movably mounted within each compartment and arranged to form a cash receiving receptacle in conjunction with one of the sides of said compartment; and means for moving said members away from the side of said compartments to deposit cash within said receiving receptacles into said compartments whenever said cash-drawer is opened; and means for preventing movement of the members when said cash-drawer is opened whereby said cash may be retained within said receiving receptacles for inspection purposes.

4. The combination with a cash-drawer having compartments, of a member movably mounted within each compartment and arranged to form a cash receiving receptacle in conjunction with one of the sides of said compartment; means for normally retaining said members in engaging relation with said compartment sides to form receiving receptacles; a trip arranged to move said members away from said compartment sides whenever said cash-drawer is opened whereby cash within said receptacles may be deposited within the compartments; and means for normally retaining said trip in operative position.

5. The combination with a cash-drawer, of a member movably mounted within each compartment and arranged to form a cash receiving receptacle in conjunction with one of the sides of said compartment; means for normally retaining said members in engaging relation with said compartment sides to form receiving receptacles; a trip arranged to move said members away from said compartment sides whenever said cash-drawer is opened whereby cash within said receptacles may be deposited within the compartments; and means for normally retaining said trip in operative position; and means for moving said trip to an inoperative position whereby cash within said receptacles may be retained therein for inspection purposes whenever said cash-drawer is opened.

In witness whereof I hereunto set my signature.

JACOB GUTKNECHT.